(12) United States Patent
Culley et al.

(10) Patent No.: US 11,868,937 B1
(45) Date of Patent: Jan. 9, 2024

(54) AUTOMATIC TROUBLESHOOTING OF CLUSTERED APPLICATION INFRASTRUCTURE

(71) Applicant: Sysdig, Inc., San Francisco, CA (US)

(72) Inventors: Harry Culley, London (GB); Adam Fischer Mangum, Richmond, CA (US); Bryan Nolan Seay, Cary, NC (US)

(73) Assignee: Sysdig, Inc., San Francisco, CA (US)

( * ) Notice: Subject to any disclaimer, the term of this patent is extended or adjusted under 35 U.S.C. 154(b) by 0 days.

(21) Appl. No.: 18/078,752

(22) Filed: Dec. 9, 2022

(51) Int. Cl.
*G06Q 10/0635* (2023.01)
*G06F 3/0483* (2013.01)
*G06F 3/0484* (2022.01)
*G06F 3/0482* (2013.01)

(52) U.S. Cl.
CPC ....... *G06Q 10/0635* (2013.01); *G06F 3/0482* (2013.01); *G06F 3/0483* (2013.01); *G06F 3/0484* (2013.01); *G06F 2203/04803* (2013.01)

(58) Field of Classification Search
CPC ........ G06Q 10/00–50/00; G06F 1/00–2200/00
USPC .............................. 705/7.11–7.42
See application file for complete search history.

(56) References Cited

U.S. PATENT DOCUMENTS

| | | | |
|---|---|---|---|
| 9,772,780 B2 * | 9/2017 | Seay | G06F 3/0665 |
| 10,747,606 B1 * | 8/2020 | Shemer | G06F 11/079 |
| 11,388,211 B1 * | 7/2022 | Breeden | G06F 16/24568 |
| 2012/0054332 A1 * | 3/2012 | Sahu | G06F 9/5088 709/224 |
| 2017/0123683 A1 * | 5/2017 | Seay | G06F 3/0611 |
| 2018/0123939 A1 * | 5/2018 | Raman | H04L 43/0811 |
| 2020/0036596 A1 * | 1/2020 | Panda | G06F 11/3452 |
| 2020/0252423 A1 * | 8/2020 | Hogg | G06Q 40/08 |
| 2022/0188172 A1 * | 6/2022 | Gupta | G06F 9/5044 |
| 2022/0237071 A1 * | 7/2022 | Wong | G06F 11/0793 |
| 2023/0082186 A1 * | 3/2023 | Balcha | G06F 11/1451 714/4.11 |

* cited by examiner

*Primary Examiner* — Alan S Miller
(74) *Attorney, Agent, or Firm* — Kim & Stewart LLP

(57) ABSTRACT

A clustered application infrastructure troubleshooting system performs a set of queries on a database of infrastructure data to retrieve a set of metrics for each of a plurality of issues. For each issue, the system analyzes a corresponding set of metrics based on detection criteria associated with the issue to detect one or more issues. The system identifies a set of remediation steps for resolving each issue and infrastructure objects affected by each of the one or more detected issues. The system performs queries on the database of infrastructure data to retrieve a set of data associated with the affected infrastructure objects. The system generates a GUI with advisories corresponding to the detected issues. Responsive to the user selecting an advisory, the system causes the GUI to present the remediation steps and the set of data associated with the one or more affected infrastructure objects corresponding to the selected advisory.

18 Claims, 11 Drawing Sheets

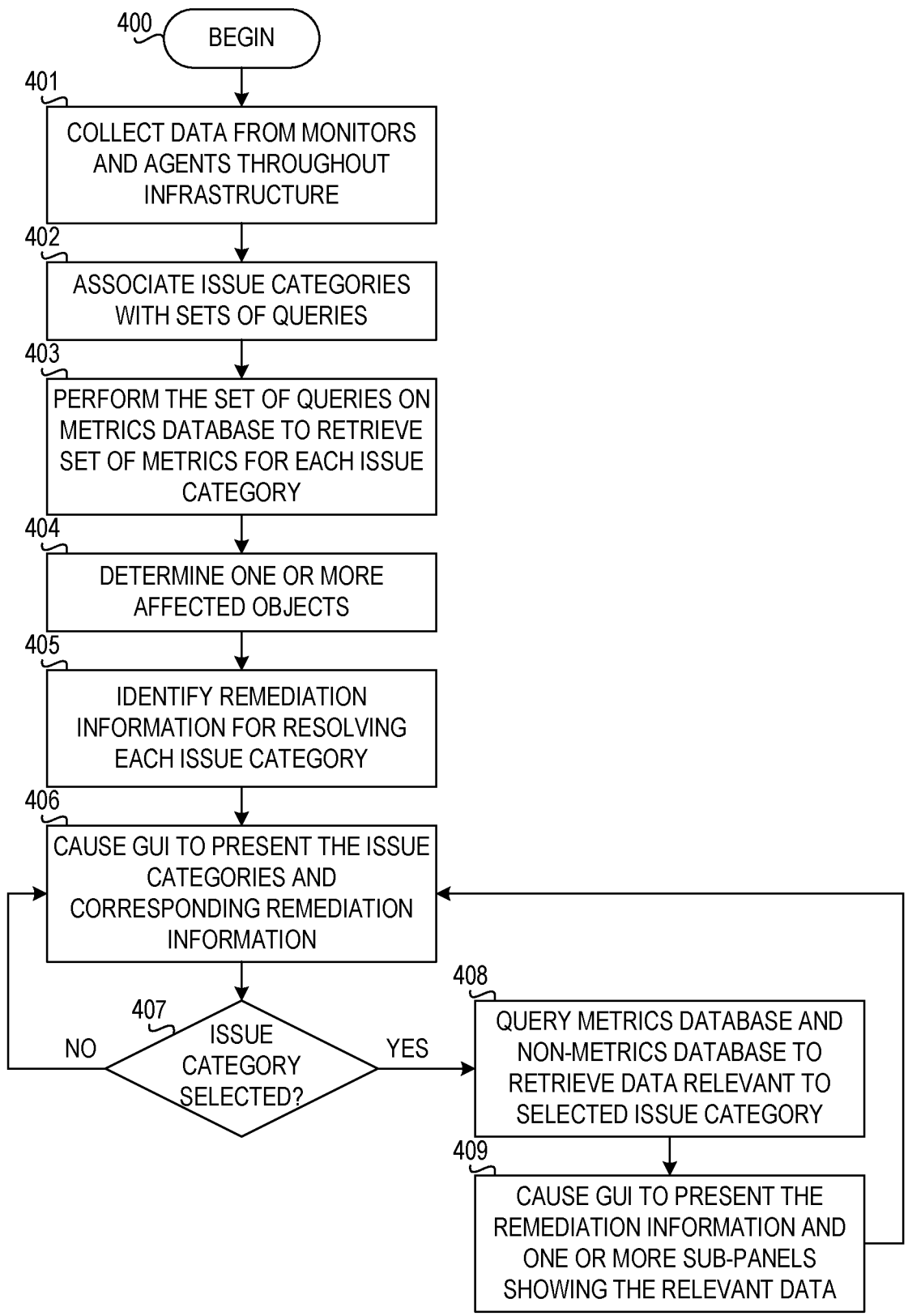

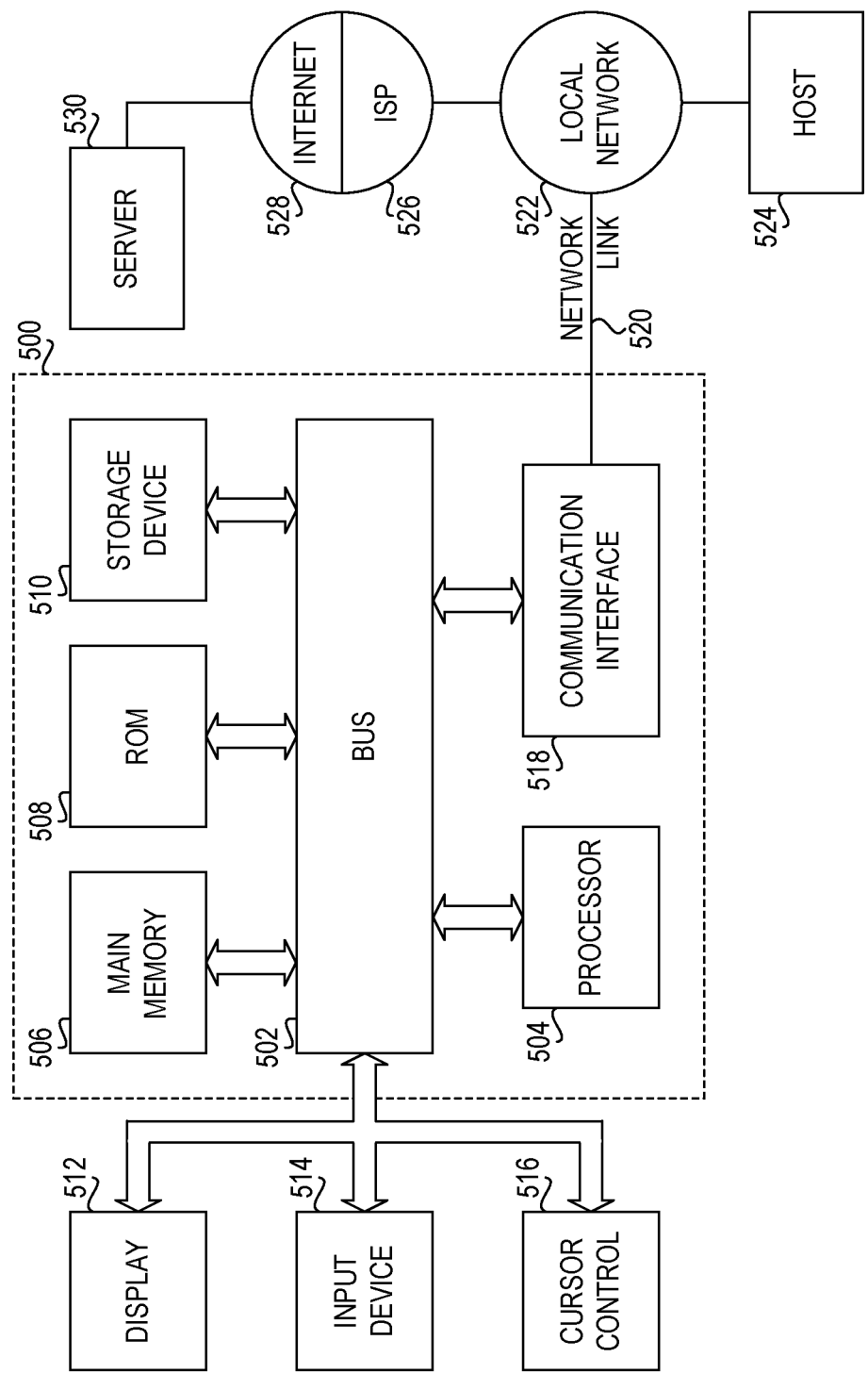

AUTOMATIC TROUBLESHOOTING OF CLUSTERED APPLICATION INFRASTRUCTURE

RELATED APPLICATIONS

This application is related to co-pending U.S. patent application Ser. No. 17/710,789, filed Mar. 31, 2022, and U.S. patent application Ser. No. 17/898,171.

FIELD OF THE INVENTION

The present disclosure relates to monitoring of a clustered application infrastructure. More specifically, the present disclosure relates to troubleshooting issues in the clustered application infrastructure.

BACKGROUND

Clustered application infrastructures are often used to run an array of software products. Clustered servers can run multiple instances of software applications at the same time. One of the benefits of implementing clustered servers is the ability to scale up when additional processing resources are required. Managing resources in a clustered application infrastructure typically requires extensive monitoring of software applications and hardware resources. Many clustered application infrastructures implement containers and container images to run the desired software. A container is a unit of software that packages up code and its dependencies so that the application may be able to run in any computer infrastructure.

Monitoring services generally gather metrics in monitoring various components of a clustered application infrastructure including, applications running within containers and any other software or hardware resources used by the applications. Metrics gathered by the monitoring services are stored and can be queried for the purposes of understanding and diagnosing how well the clustered application infrastructure is performing. Many monitoring applications provide metrics that are localized to the specific resource being monitored. Furthermore, depending on the scale of a clustered application infrastructure, the amount of data being collected can be too large to be managed effectively using conventional approaches. With dozens of clusters executing hundreds of containers, for example, it can be difficult to detect issues or to pinpoint causes, resulting in issues remaining undetected or unresolved. It would be helpful to enable efficient retrieval of rich monitoring information. It would be further helpful to enable effective utilization of the rich monitoring information to detect and remediate issues occurring throughout the clustered application infrastructure.

BRIEF DESCRIPTION OF THE DRAWINGS

In the drawings:

FIG. 4 is a flowchart illustrating operation of a troubleshooting system in accordance with an illustrative embodiment.

FIG. 5 is a block diagram that illustrates a computer system upon which embodiments of the invention may be implemented.

DETAILED DESCRIPTION

Figure 1:
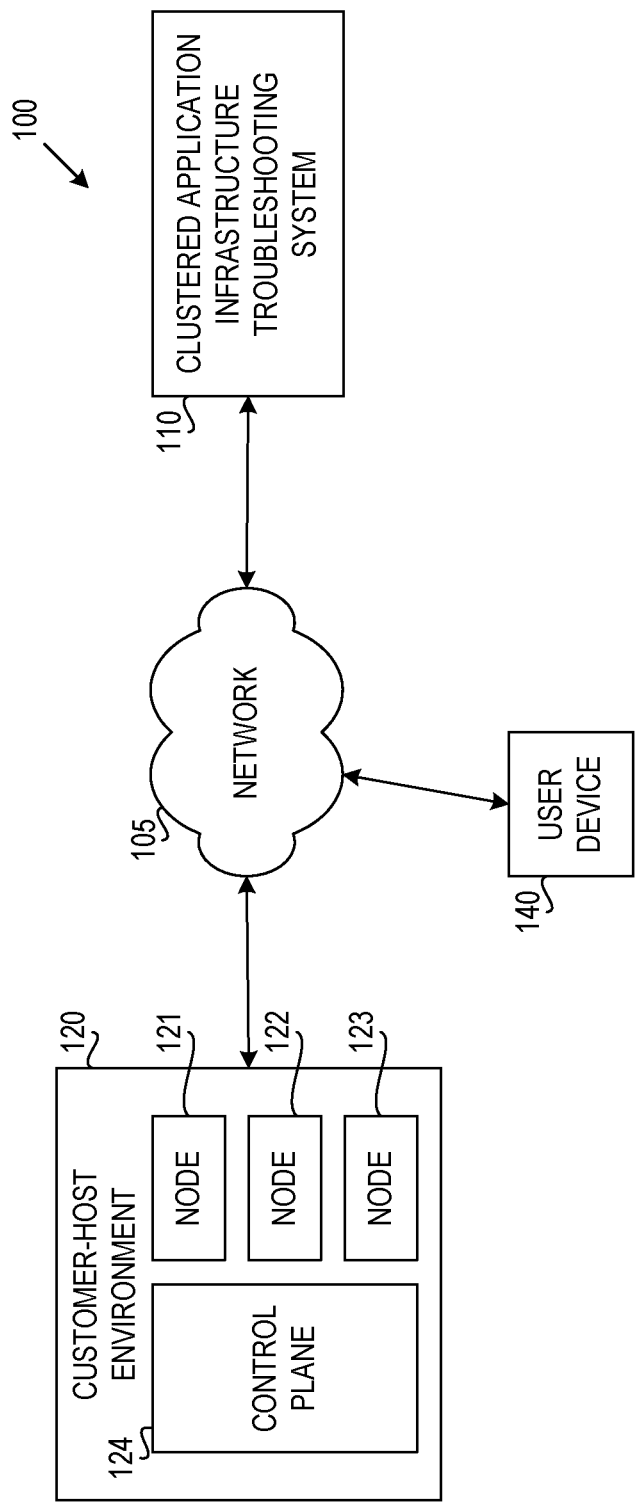
FIG. 1 is a diagram illustrating an example clustered application infrastructure in which a monitoring or troubleshooting system is programmed to monitor at least one customer-host environment in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Modifiers such as "first" and "second" may be used to differentiate elements, but the modifiers do not necessarily indicate any particular order.

Embodiments are described herein according to the following outline:
   1.0 General Overview
   2.0 Structural Overview
   3.0 Functional Overview
      3.1 Collection of Metrics and Relevant Data
      3.2 Detection of Issues in Clustered Application Infrastructure
      3.3 Identification of Data Relevant to Issue Remediation
      3.4 Guidance and Implementation of Issue Remediation
      3.5 Example Graphical User Interface Implementation
   4.0 Procedural Overview
   5.0 Implementation Example—Hardware Overview
   6.0 Extensions and Alternatives
General Overview 1. General Overview A troubleshooting system for troubleshooting issues in a clustered application infrastructure is disclosed. In some embodiments, the troubleshooting system is configured to collect data from various components throughout the clustered application infrastructure and store the collected data in a database. The collected data can include, but are not limited to, events recorded by monitors or agents executing at or near the components being monitored within the infrastructure, customized metrics, predefined performance metrics, or predefined metrics describing features of objects, components, or any other type of entity, such as locks from running containers, within the clustered application infrastructure. For example, the clustered application infrastructure can be managed by the Kubernetes® cluster management framework, which communicates with Prometheus to collect metrics from various components within the clustered application infrastructure.

The Kubernetes® framework is an open-source platform for managing containerized applications and services. Embodiments are not limited to only using Kubernetes® framework, other embodiments can utilize any type of cluster management framework for a distributed system. KUBERNETES® is a registered trademark of the Linux Foundation in the United States and other countries. LINUX® is the registered trademark of Linus Torvalds in the United States and other countries.

Examples of performance metrics can represent measurements such as usage of central processing units within a container or host machine, memory usage within a container or host machine, network latency, processing latency related to executing tasks, or any other measurable metric related to the general operation or utilization of computing resources of a component in the clustered application infrastructure. In an example embodiment, a data collection service is implemented to receive, organize, and store metrics in a manner that facilitates efficient querying of the data by user devices and by other services executing within the troubleshooting system.

As used herein, an "object" is a hardware entity or software component monitored by the cluster management framework at multiple levels of the infrastructure hierarchy, which can include the entire clustered application infrastructure on a first level, one or more clusters on a lower level, one or more namespaces under each cluster, one or more workloads under the namespace level, and one or more pods under each namespace. Thus, the infrastructure hierarchy can be as follows: cluster/namespace/workload/pod. This is only an example implementation, and other hierarchies can be used depending on the cluster management framework being used.

In addition to performance metrics, the troubleshooting system can also collect non-metric data, which can be stored in the same tables as the performance metrics, in separate tables in the same database, or in a separate database. In one embodiment, the troubleshooting system collects performance metrics into a metrics database and non-metric data into a non-metrics database. In one embodiment, the metrics data are stored in a specific format that can be queried by the Prometheus query language where the metrics and contextual data are aggregated into a combined dataset that represents the metric and related entity information, which have been flattened into a single row. In this embodiment, each row in a table of metric data includes related entity information for the entire path through an infrastructure hierarchy associated with the clustered application infrastructure. Such an infrastructure hierarchy can correspond to cluster, workloads, namespaces, pods, or other entities at various levels. The non-metric database stores data related to the entities in the clustered application infrastructure, such identifying information about the entities, event logs, queries or other detection criteria regarding an issue category, lists of potential causes, or lists of potential remediation steps. The non-metric databases would normally not be queried by the Prometheus querying language. The issue categories can include performance issues, low or exhausted resource availability, error states, degraded states, unresponsive or crashed pods or containers, or halted or force stopped pods or containers within the clustered application infrastructure.

In some embodiments, the troubleshooting system is programmed to query the database for sets of metrics that indicate issues that can occur throughout the clustered application infrastructure. The queries are configured to surface known issues that are common in clustered application infrastructure. The troubleshooting system is further configured to process the results of the queries to detect issues or to determine affected objects within the clustered application infrastructure. The issues can be classified into categories ("issue categories"), such as Pods in CrashLoop-BackOff (i.e., containers in pods failing and restarting repeatedly), Pending Pods (i.e., pods that cannot be scheduled), CPU Throttling (i.e., the CPU usage of some containers reaches a limit affecting performance), Node Pressure (i.e., one or more cluster nodes are using too many resources resulting in pods being terminated), or PV Full (i.e., one or more clusters reach persistent volume (PV) storage limits), for example. One or more instances of the same issue category can be occurring at the same time, possibly to different objects at different levels of the infrastructure hierarchy. Thus, for each issue category, there can be zero or more instances of the issue. For example, for the "Pending Pods" issue category, there can be multiple pods that cannot be scheduled, and thus there would be multiple instances of that issue category.

The troubleshooting system is configured to then query the non-metrics database for remediation steps corresponding to each issue category, including identifying data relevant to remediation of the set of detected issues. The relevant data can be retrieved from the metrics database, the non-metrics database, or both, and can include objects affected by an issue category, event logs, container logs, resource usage, container status, pod status, or CPU or memory requestable on a node, for example.

The troubleshooting system is configured to generate a graphical user interface with advisories corresponding to the detected issues and to cause the graphical user interface to be presented by a user device. As used herein, an "advisory" is a presentation of one or more detected instances of an issue category, remediation steps for resolving the one or more detected instances, and data relevant to remediating the one or more issue instances. Each advisory represents a remediation process for an issue category. In response to the user selecting an advisory, the graphical user interface presents the remediation steps for the corresponding issue category or specific instances and one or more panels showing data relevant to resolving the specific issues.

In some embodiments, the graphical user interface manages context-dependent information within advisories corresponding to a given level of a hierarchy of the infrastructure (infrastructure hierarchy). The graphical user interface can prioritize presentation of data at different levels of the infrastructure hierarchy based on the nature of the issues and allow users to navigate among the different levels.

In one embodiment, in response to the user selecting a level of the infrastructure hierarchy, the graphical user interface presents a subset of the detected issue categories corresponding to the selected level of the infrastructure hierarchy. Thus, if a user selects a particular cluster in the infrastructure, the graphical user interface presents those issue categories that affect objects in the selected cluster. Thus, the user can drill down on a level of the infrastructure hierarchy and focus on a subset of the detected issue categories that affect a particular level of the infrastructure hierarchy.

In another embodiment, in response to a user selecting an issue category, the graphical user interface presents objects affected by the selected issue category. Then, in response to the user selecting a level of the infrastructure hierarchy with an issue category selected, the graphical user interface presents a subset of the affected objects that correspond to the selected level of the infrastructure hierarchy. For example, if the user selects the "CrashLoopBackOff" issue category, which is by design associated with the pod level, the graphical user interface can present five pods under three clusters affected by the issue. If the user then selects a cluster within the infrastructure hierarchy, the graphical user interface can then present two pods from the selected cluster.

In another embodiment, selecting a level of the infrastructure hierarchy with an issue category selected can cause the graphical user interface to filter the relevant data relevant to the selected issue category based on the selected level of the infrastructure hierarchy. For example, if the user selects the "Pending Pods" issue category, which is by design associated with the pod level and related to event logs for pods, the graphical user interface can present events that are related to all the affected pods under multiple workloads in the "Pending Pods" issue category. Then, if the user selects a particular workload in the infrastructure hierarchy, the graphical user interface can present only events from the selected workload that are relevant to the pods under the selected workload.

The troubleshooting system disclosed herein improves the performance and functionality of a clustered application infrastructure by providing an improved workflow for identifying and resolving issues occurring in the clustered application infrastructure. For example, the troubleshooting system is configured to efficiently collect relevant data from monitors and agents executing throughout the infrastructure and to query the collected data to identify issues that would be difficult to diagnose and resolve using conventional approaches. The troubleshooting system is further configured to provide workflows that guide users to resolve issues that could otherwise take longer to resolve. As another example, the troubleshooting system is configured to organize and present all data infrastructure-wide that are relevant to each issue at each level of the infrastructure hierarchy, in one graphical user interface, thus making remediation faster and more effective. The result is improved performance of the clustered application infrastructure.

2.0 Structural Overview

In some embodiments, software applications are deployed into managed software containers. For instance, an application can be packaged as a deliverable image that can be loaded and executed in multiple instances of a software container. A software container provides a portable execution environment that can insulate an application from some aspects of a physical computer that hosts the container. Multiple instances of the same application in multiple container instances can provide scaling for increased throughput, handling spikes in application demand, redundancy for high availability, and hardware independence for vertical scaling. A software container can be deployed within a virtual machine, a virtual operating system, or any other infrastructure for managed execution of applications. An application may be referred to as a containerized application, a clustered application, or a distributed application, herein. A software container may be referred to as simply a container, herein.

In some embodiments, multiple instances of the same or different software containers are managed by a cluster management framework for remotely administering multiple instances of the same or different distributed application. In an embodiment, a pod is a deployable object that may represent an instance of a running process managed by a Kubernetes® cluster management framework. A pod can contain one or more containers.

The aspects of the illustrative embodiments apply to any cluster management framework. For purposes of illustration, the various example embodiments shown and described in this disclosure refer to the Kubernetes® framework. Thus, the illustrative embodiments are described using terminology of the Kubernetes® framework, although this is not intended to limit the invention to any one cluster management framework. The Kubernetes® framework groups containers that make up an application into logical units for easy management and discovery. A clustered application infrastructure includes one or more clusters, each having one or more namespaces, each namespace running one or more workloads, and each workload running one or more pods. A physical cluster is divided into two components: a control plane configured to provide the core services and orchestration of workloads, and nodes configured to run the application workloads. Applications run in containers. A pod is a logical resource that maps to containers. A pod can be mapped to one or more containers. A workload comprises one or more pods. Workloads are logically grouped into namespaces to divide a cluster and create, view, or manage access to resources. Performance statistics of distributed applications, containers for the applications, and hardware used by the applications can be monitored. The Kubernetes® cluster management framework communicates with Prometheus to collect metrics from various components within the clustered application infrastructure. Prometheus is an open-source monitoring system with a dimensional data model, flexible query language, efficient time series database, and modern alerting approach. Prometheus collects and stores metrics as time series data. In other words, metrics information is stored with the timestamp at which it was recorded, alongside optional key-value pairs called labels. Metrics are numeric measurements. Time series means that changes are recorded over time. Metrics play an important role in understanding why an application is working, or not working, in a certain way.

In various embodiments, various combinations of monitoring infrastructure that provide discovered and monitored data can include the cluster management framework, the application itself, and dedicated monitoring services and agents. Monitored data can include metrics, configuration, and topology details such as release versions, hosts, ports, or container names that can be indicated through annotations, labels, or other metadata. Metrics are provided by on-demand or periodic network polling of well-known or assigned network ports and according to custom or standardized communication protocols and formats such as hypertext transfer protocol (HTTP) and JavaScript object notation (JSON). For example, a pod can receive a monitoring poll as an HTTP request on a network port. The HTTP request may or may not identify particular metrics, and the pod can reply by sending an HTTP response that contains formatted measurement values, such as name-value pairs. Such metrics can include current resource consumption such as central processing unit (CPU) cycles, volatile memory, and network bandwidth. Repeated polling of metrics can provide recordable history of the configuration and performance of each computer node, pod, container, workload, or cluster.

FIG. 1 is a diagram illustrating an example of a customer-host environment implemented to troubleshoot issues occurring in a clustered application infrastructure implemented in the customer-host environment in accordance with an illustrative embodiment. System 100 contains a troubleshooting system 110, a customer-host environment 120, and a user device 140 communicatively coupled via network 105. In one embodiment, clusters are managed by a cluster management framework. Multiple customers can run their applications on different sets of sub-clusters. In an example embodiment, the troubleshooting system 110 also runs on the same clusters managed by the cluster management framework. In the example depicted in FIG. 1, the customer-host environment refers to one such customer sub-cluster. Therefore, in one embodiment, everything shown in FIG. 1 can be run on the same cluster managed by the same cluster management framework instance. Components of the troubleshooting system 110 can run on different nodes of the customer-host environment 120.

In an embodiment, the customer-host environment 120 represents an execution environment for client applications that resides on a clustered or cloud-computing platform. The customer-host environment 120 can include one or more host computers running one or more host applications or containerized client applications. The customer-host environment 120 can include a client agent implemented to collect data about the customer-host environment 120 and provide the metrics to the troubleshooting system 110. Data collected by the troubleshooting system 110 can include, but are not limited to, metrics tracking performance of containerized applications, container resources, processor and memory resources, and any other hardware and/or software resources provisioned to deployments within the customer-host environment 120. In an embodiment, the client agent implemented can collect metrics from various sources including, but not limited to, process-level metrics such as system calls, operating system level metrics, Java Management Extension metrics, http endpoint metrics defined by Prometheus protocol, or any other metrics.

The data collected by the troubleshooting system 110 can also include non-metric data, such as event logs. These non-metric data can be stored in a same table with the metric data, in a separate table within the same database, or in a separate database or other data structure. For example, a row of metric data can include a reference to a separate event log data structure. Other examples of non-metric data relevant to issue remediation include metadata about entities (e.g., pods).

FIG. 1 depicts the customer-host environment 120 with nodes 121, 122, 123 and control plane 124. Nodes 121, 122, 123 may represent a set of worker machines that are configured to run containerized applications. Control plane 124 represents an entity configured to manage the nodes 121, 122, and 123. In some embodiments, control plane 124 can be a service that runs on multiple computing devices. An example of control plane 124 can include the Kubernetes® cluster management framework.

In an embodiment, the troubleshooting system 110 represents a system for collecting, processing, and storing metrics for the customer-host environment 120 and for providing troubleshooting and remediation of issues detected infrastructure-wide. The troubleshooting system 110 is configured to collect real-time data from the customer-host environment 120, process the collected data, and stores the processed data in a database. The troubleshooting system 110 is configured to then query the database according to predetermined or learned processes associated with categories of known issues. The troubleshooting system 110 is configured to process results of the queries to detect issues in clustered application infrastructure as implemented on the customer-host environment 120. For example, the queries can gather data pertaining to the states of pods, CPU usage, memory usage, etc. The troubleshooting system 110 is configured to then compare performance metrics to thresholds, which can be learned from processing historical event logs or other sources, to detect categories of issues occurring in the clustered application infrastructure. As such, each category of issues (e.g., CrashLoopBackOff, Pending Pods, CPU Throttling, Node Pressure, etc.) can have an associated set of queries and detection criteria. Executing the queries can result in zero or more instances for each issue category.

The troubleshooting system 110 is configured to generate a graphical user interface (GUI) to be presented by user device 140 for troubleshooting and remediating issues detected in the clustered application infrastructure. In one example embodiment, the GUI is transmitted to the user device 140 via a client application executing on user device 140 and implementing Application Programming Interfaces (APIs) to the troubleshooting system 110. In another example embodiment, the GUI is presented to the user device 140 via a Web server (not shown) wherein the user device 140 executes a Web browser and accesses the GUI on the Web server using Hypertext Transport Protocol (HTTP). The troubleshooting system 110 causes the GUI to present context-dependent advisories corresponding to the detected issues.

The troubleshooting system 110 also queries one or more databases storing metric data and non-metric data for data relevant to remediation of the detected issues. The GUI presents advisories that include one or more context-dependent panels showing data relevant to each detected issue category. In response to a user at user device 140 selecting an issue category, the GUI presents the remediation information and one or more panels showing data relevant to remediation of the selected issue. The remediation information can include descriptions of what causes a given issue, what data to look for when troubleshooting the given issue category, or steps to take to remediate the given issue category. The remediation information can be presented in a separate panel with diagrams and textual descriptions. In one embodiment, the remediation information can include references to the relevant data or links to the one or more panels, tabs, or other portions of the GUI. In response to the user selecting a level of the infrastructure hierarchy, the GUI presents a subset of the detected issues corresponding to the selected level of the infrastructure hierarchy, a subset of the objects affected by a given issue category, or a subset of the data relevant to a given issue category. In this manner, the GUI guides the user to perform remediation of the detected issues with context-dependent display of remediation information and relevant data.

User device 140 represents a computing device, used by a user, to interact with the GUI generated and provided by the troubleshooting system 110. In an embodiment, the user device 140 may represent any type of computing device including, but not limited to, a laptop, a desktop, a tablet, a smartphone, and any other computing device that implements a client application for accessing or presenting the GUI generated by the troubleshooting system 110.

Each of the customer-host environment 120, troubleshooting system 110, and user device 140 are communicatively coupled to each other via network 105. In an embodiment, the network 105 facilitates the exchange of communication and collaboration of data between each of the customer-host environment 120, troubleshooting system 110, and user device 140. The network 105 can be any type of network that provides communications, exchanges information, and/or facilitates the exchange of data between the customer-host environment 120, troubleshooting system 110, and user device 140. For example, the network 105 may represent one or more local area networks (LANs), wide area networks (WANs), metropolitan area networks (MANs), global interconnected internetworks, such as the public internet, public switched telephone networks ("PSTN"), or any other suitable connections or combinations thereof that enable the customer-host environment 120 to send information to the troubleshooting system 110. Each network 105 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 105 and the disclosure presumes that all elements of FIG. 1 are communicatively coupled via network 105.

3.0 Functional Overview

Figure 2:
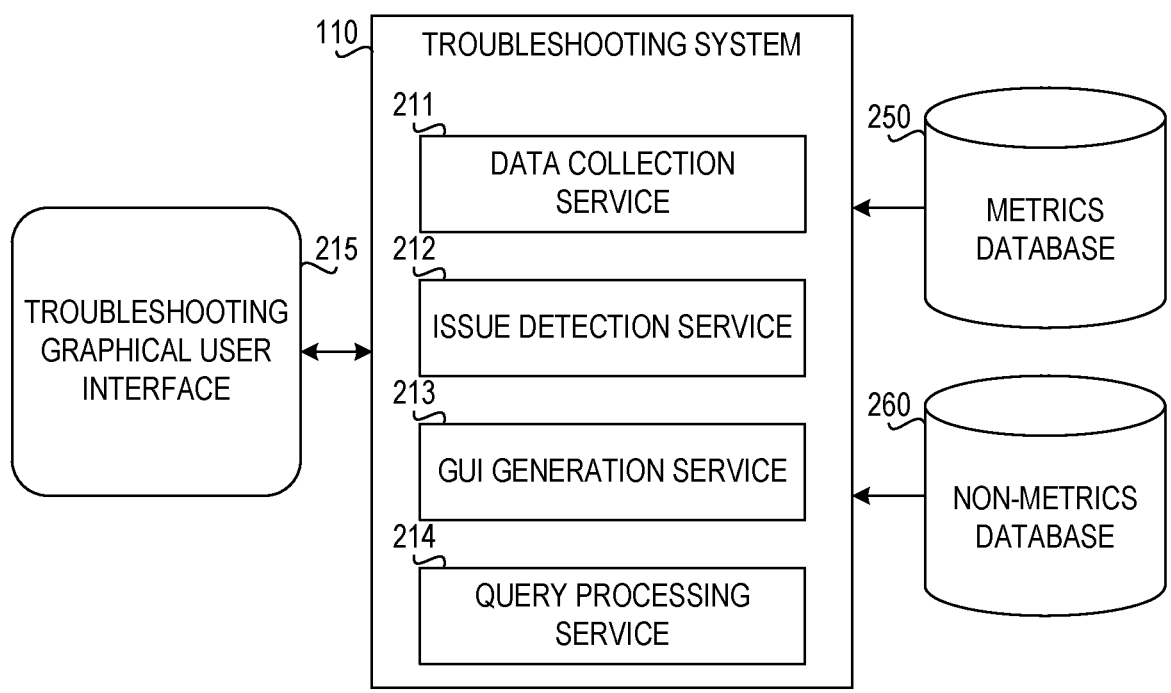
FIG. 2 is a diagram illustrating example functional components of a troubleshooting system in accordance with an illustrative embodiment.

FIG. 2 is a diagram illustrating example functional components of a troubleshooting system in accordance with an illustrative embodiment. FIG. 2 is an expanded diagram of the troubleshooting system 110. In an embodiment, the troubleshooting system 110 contains sets of instructions, services, or modules which, when executed by one or more processors, perform various functions related to collecting and aggregating data, querying the data to detect issues in the infrastructure, and generating a graphical user interface for troubleshooting and remediation of the detected issues. In FIG. 2, the troubleshooting system 110 is configured with a data collection service 211, an issue detection service 212, a GUI generation service 213, and a query processing service 214. The troubleshooting system 110 depicted in FIG. 2 represents just one illustrative example of the troubleshooting system 110 and is not intended to be limited to having only the services depicted in FIG. 2. For instance, the troubleshooting system 110 can include fewer or additional services and modules not currently shown in FIG. 2.

3.1 Collection of Metrics and Relevant Data

In an embodiment, the data collection service 211 represents a service for collecting, processing, and storing metrics for the customer-host environment infrastructure-wide. For example, the data collection service 211 can receive metrics recording CPU usage by each containerized application. In an embodiment, the data collection service 211 can be configured to receive metrics and metadata from other sources, such as data server metrics provided by a third-party storage service such as Amazon Web Services™ (AWS). The data collection service 211 is configured to collect metrics and contextual data describing relationships between entities in the clustered application infrastructure that are related to the performance data. The data collection service 211 is configured to process the collected data by aggregating the metrics and the contextual data into a combined dataset. The combined dataset may represent the metric and related entity information, which have been flattened into a single object containing the metric and all relevant metadata providing a full contextual information about the metric. The data collection service 211 can store the metrics in the metrics database 250 which can be queried against by user devices or by the query processing service 214 of the troubleshooting system 110.

In an embodiment, the data collection service 211 is implemented to receive metrics from one or more agents running on the customer-host environment 120, analyze labels that help identify related entities in the customer-host environment 120, and augment time series data that represents metrics. Metrics can be received in the form of a time series dataset. A time series is a set of data points indexed in time order. For example, a time series of CPU percent usage by an entity can be a dataset of CPU percent values indexed using timestamps for when each CPU percent value was observed. Labels representing basic contextual metadata, which identify the entity, such as a container, can be provided with the time series. For example, the time series of CPU percent usage can have associated labels identifying the container for which the CPU percent usage applies, such as container name and container ID, additionally identifying the host machine on which the CPU resides, and any other attributes that can be useful for identifying the time series data.

In an embodiment, the data collection service 211 can receive or generate metrics in the form of a binary large object (blob) or any other data object that contains time series data of metrics and enriched metadata about the customer-host environment 120. The blobs can include time series data for various different metrics and their associated labels, as well as any other additional metadata about the customer-host environment 120. For example, the metric for CPU percent usage for a particular container discussed above can additionally include information identifying the pod and cluster for which the particular container belongs or cloud provider information. The metric is thus extended with enriched labels and the extended metric could be stored as a row in the blob representing a single table in the database. Additional metadata included in the blob can include container information obtained from other metrics in the blob, customer-host environment configuration information, or a combination of both.

As described above, the metrics database 250 stores the metrics data such that it can be used in a productive way with improved performance and usability. Because every metric is extended with enriched labels and then stored as a row in a single table, no query requires a join and thus could be executed efficiently. In the example of a container metric, a query at the pod level might not consider the original metric that does not indicate the pod context but would consider the extended metric due to the enriched labels. As a result, each query returns results that are or can be efficiently segmented in accordance with the levels of the hierarchy. For example, a query that returns pods that satisfy a specified condition will return pods segmented by workload, namespace, and/or cluster. This means that the troubleshooting system 110 can easily retrieve appropriate information regarding an issue based on this metric at different levels. As a result, queries can be performed much more efficiently and quickly, thus providing a more responsive user experience. Further description of augmenting performance metrics with metadata in a clustered application infrastructure can be found in U.S. patent application Ser. No. 17/710,789, filed Mar. 31, 2022, the entirety of which are hereby incorporated by reference.

The data collection service 211 can also receive or generate non-metrics data to help with remediation of issues. The data in metrics database 250 would not contain certain data, such as event logs or container logs, which can be large data files; rather, a pointer to the location of such data can be stored in metrics database 250. The data collection service 211 can retrieve and store these non-metrics data in non-metrics database 260. In one embodiment, non-metrics data can be stored locally in non-metrics database 260. The data in the non-metrics database 260 can be utilized for detecting issues. For example, patterns of events in an event log can be indicative of an issue. Furthermore, data in the non-metrics database 260 can be relevant to issue remediation and, thus, can be displayed in association with a given issue category, as will be described in further detail below.

3.2 Detection of Issues in Clustered Application Infrastructure

The issue detection service 212 queries the metrics data in metrics database 250 and compares the results of the queries against detection criteria for categories of issues. Each category of issues can have an associated set of queries and detection criteria. For example, the issue category of "CrashLoopBackOff" can be associated with the following query:

sum by(kube_cluster_name, kube_namespace_name, kube_workload_name, kube_pod_name, reason) (kube_pod_container_status_waiting_reason{reason= "CrashLoop BackOff"})

If the query results in a match of a container that is in a "waiting" status for the reason of "CrashLoopBackOff," then the pod associated with the container is an instance of the issue category. In the above, example, the detection criteria is a pod or container that matches the query; however, other issue categories may have other detection criteria, such as a performance metric exceeding a threshold, for example. For each issue category, the issue detection service 212 identifies zero or more instances of the issue category. For example, for the category of Pending Pods, there may be multiple pods that cannot be scheduled, resulting in multiple instances of the issue category of "Pending Pods."

In one embodiment, issue categories of issues can be ranked according to severity or scope. The severity of each category can be predetermined based on input from subject matter experts, for example.

The issue detection service 212 can also determine which objects in the infrastructure hierarchy are affected by a detected issue category instance. In the above example of the "CrashLoopBackOff" issue category, the issue detection service 212 detects a container that is in the "waiting" status for the reason of "CrashLoopBackOff." Thus, the pod associated with the container is an affected object when the pod is defined as the lowest level of the infrastructure hierarchy. In this way, the troubleshooting system predefines an association between an issue category and a level of the infrastructure hierarchy, which can be used to determine how to present relevant data in a graphical user interface, as further discussed in later sections. It follows that the workload, namespace, and cluster associated with the affected pod are also affected objects. The affected objects associated with an instance of an issue category, or with the issue category in general, can be determined by querying for the context metadata associated with a metric in the metrics database 250.

3.3 Identification of Data Relevant to Issue Remediation

The graphical user interface (GUI) generation service 213 directs the query processing service 214 to execute sets of queries for building panels with data relevant to remediation of detected issues. In one embodiment, the GUI generation service 213 builds the panels of relevant data dynamically when a user selects a GUI element. In an alternative embodiment, once an instance of a given issue category is detected, the troubleshooting system 110 can be programmed to immediately execute queries to fetch all relevant data, rather than execute queries on demand. These queries can be directed to metrics database 250, non-metrics database 260, or both.

In one embodiment, the panels to be generated for the GUI are static and predetermined based on issue category. For example, for the "CrashLoopBackOff" issue category, the GUI generation service 213 builds panels for containers, events, and resource usage, and for the "Pending Pods" issue category, the GUI generation service 213 builds panels for pod status, events, and node metrics.

In another embodiment, the query processing service 214 can also execute queries to determine context metadata for objects, such as cluster, namespace, workload, and pod labels. In a further embodiment, the query processing service 214 can execute queries to retrieve information identifying the remediation steps to display and which subpanels to build in the troubleshooting GUI 215. In an example embodiment, the GUI generation service 213 determines which panels to build and which queries to make based on the issue category selected and the level of the infrastructure hierarchy selected by the user. Thus, if the user selects the "CrashLoopBackOff" issue category and selects a given workload in the infrastructure hierarchy, then the GUI generation service 213 executes queries associated with the "CrashLoopBackOff" issue category that are specific to the selected level of the infrastructure hierarchy.

3.4 Guidance and Implementation of Issue Remediation

The GUI generation service 213 generates GUI components for presenting advisories for the issues detected by the issue detection service 212. GUI generation service 213 generates troubleshooting graphical user interface 215 to present the advisory GUI components. In an embodiment, the advisory GUI components are presented in what can be referred to as an "advisory dashboard." Alternatively, the advisory GUI components can be presented in response to the user selecting an "Advisories" tab of a cluster management GUI display. In one embodiment, a user can enter a cluster management GUI display periodically to perform other cluster management functions and can check on advisories as part of regular cluster management. In another example embodiment, a user can request to view the advisory GUI components in response to receiving an alert or notification, such as an email alert or text message, indicating that an issue has occurred. In this example, the GUI can include an "Alerts" tab for viewing such alerts, and a typical flow can be that a user first checks the Alerts tab to view a list of alerts, selects a relevant level of the infrastructure hierarchy, and then go to the Advisories tab that shows the list of advisories for the selected level to begin issue troubleshooting or remediation. The underlying data can be generated upon request or according to a schedule.

In one embodiment, troubleshooting GUI 215 presents a first panel showing a hierarchical view of the clustered application infrastructure. The infrastructure hierarchy includes the entire infrastructure on a first level, one or more clusters on a lower level, one or more namespaces under each cluster, one or more workloads under the namespace level, and one or more pods under each namespace. Thus, the infrastructure hierarchy is as follows: cluster/namespace/workload/pod. This is only an example implementation, and other hierarchies can be used depending on the cluster management framework being used. In some embodiments, the infrastructure hierarchy includes all levels applicable to a particular custom-host environment, or all levels visible to a user based on the user's access control permission. In other embodiments, the infrastructure hierarchy includes only levels that are relevant to the selections in other areas of the GUI 215. Thus, if a user selects a particular issue category, the GUI 215 can prune the hierarchy infrastructure to include only those levels of the infrastructure that include objects affected by the selected issue category. This would simplify the GUI 215 so the user does not explore levels of the hierarchy that are not affected by an issue category of interest.

In one embodiment, the troubleshooting GUI 215 presents a second panel showing advisories and providing an interactive approach to detected issues, remediation steps, and data relevant to remediating the issues. In one embodiment, the detected issues can be represented as card graphics with one card for each issue category. In one embodiment, selection of an issue category causes display of a third panel showing affected objects within the clustered application infrastructure. In another embodiment, selection of an issue category or an affected object causes display of a remediation GUI sub-panel and one or more sub-panels presenting data relevant to remediation of the selected issue or object. For example, selection of a pod can result in sub-panels for containers executing within the pod, events associated with the pod, and resource usage by containers within the selected pod. The remediation GUI sub-panel can be expanded to present troubleshooting information or remediation steps, such as likely causes of the issue, data to look for in the one or more panels, and steps to be taken to resolve the issue, for example.

In one embodiment, the troubleshooting GUI 215 allows the user to interact with the sub-panels to focus on the data presented therein. For example, the user can select a container to show container-specific information, such as container logs. As another example, a user may select a computing node to show central processing unit (CPU) and memory usage metrics. The infrastructure hierarchy presented in the first panel can also be used to filter the sub-panels shown in the second panel. For example, if advisories for the detected issue categories are shown without a particular issue category being selected, then the user can select a level of the infrastructure hierarchy in the first panel to filter the advisories in the second panel to include only those advisories having affected objects in the selected level of the infrastructure hierarchy. As another example, if the user selects a level of the infrastructure hierarchy with a particular advisory being selected, then the second panel of the troubleshooting GUI 215 will only show sub-panels with data relevant to the selected issue category and specific to the selected level of the infrastructure hierarchy.

In a further embodiment, the troubleshooting GUI 215 can include tabs to divide the relevant data into categories. For example, with the "Pods in CrashLoopBackOff" issue category selected, the troubleshooting GUI 215 can include tabs for "Container," "Disk," "Network," "Logs," and "Events." The user can select these tabs to focus the sub-panels display in GUI 215 to specific categories of information. Thus, in the Advisories display, all sub-panels associated with an issue category can be presented. In one embodiment, the sub-panels presented in this view can focus on important information. For example, an "Events" sub-panel can show only the most important events associated with a given issue category. Selecting an "Events" tab will present the full events log information. In another embodiment, the user can navigate to the full events log information by selecting the "Events" sub-panel itself, thus presenting alternative interactions that lead to the same information.

In some embodiments, what the GUI 215 includes changes over time based on user interaction. For example, a machine learning process as known to someone skilled in the art can be applied to detect whether specific series of user-chosen options tend to be taken more often or tend to lead to issue resolution. For example, these options could include selecting an infrastructure hierarchy level, viewing pod or container event logs, and looking for database connection events, or correlating CPU usage between two pods. The GUI 215 can then be configured to show those options in a more prominent fashion or provide information regarding why certain options are recommended based on histories of actions across multiple user or user devices.

In another embodiment, the troubleshooting GUI 215 can present an indicator of a level of the infrastructure hierarchy in the first panel. The level of the infrastructure hierarchy can be set to the entire infrastructure as a default level. In response to the user selecting an affected object, the indicator will change accordingly. In one embodiment, the user can expand the infrastructure hierarchy in the first panel and select a level of the infrastructure hierarchy. The indicator will then change to the selected level. In response to user selection of a level of the infrastructure hierarchy in the first panel, the troubleshooting GUI 215 presents advisories corresponding to the selected level in the second panel.

In further embodiments, the troubleshooting system is configured to perform automated steps to remediate detected issues. For instance, some issues can be resolved by assigning more resources to one or more clusters. In this case, the remediation information can prompt the user to authorize performing the remediation steps. In other embodiments, the troubleshooting system can use machine learning models to learn remediation steps that will resolve the issues with the highest confidence. The troubleshooting system is configured to then rank remediation alternatives according to confidence values. The machine learning models can include supervised machine learning models that improve over time based on user feedback.

As an example, the "Pending Pods" issue category can occur if the amount of processor or memory resources allocated on a cluster for a pod is insufficient. The troubleshooting system can determine amount of processor or memory resources to allocate for the pod to satisfy predetermined utilization criteria and automatically perform the allocation of the additional resources. As another example, the troubleshooting system can present remediation candidate actions and learn which candidate remediation actions a user prefers. Alternatively, the troubleshooting system can learn which candidate remediation actions are more likely to resolve the issue and highlight the more effective remediation actions to the user. In a further embodiment, the troubleshooting system can calculate a confidence value for each remediation action based on whether the action is preferred by the user and/or whether the action effectively resolves the issue. If a confidence value of a given remediation action is above a predetermined threshold, then the troubleshooting system can automatically execute the given remediation action or prompt the user to perform the remediation action.

FIG. 2 shows services 211-215 executing within the same computing system; however, one or more of the services, or all of the services, can be implemented on separate machines. For instance, the data collection service 211 can be implemented as its own computing system. Furthermore, while the metrics database 250 is shown as closely associated with the troubleshooting system 110, the metrics database 250 can be stored separately in association with its own database server and can be accessible by user devices for data retrieval outside the operation of the troubleshooting system 110. Furthermore, as described above, the troubleshooting GUI 215 can be implemented using a Web server, which can be integrated within the troubleshooting system 110 or implemented separately.

3.5 Example Graphical User Interface Implementation

Figure 3A:
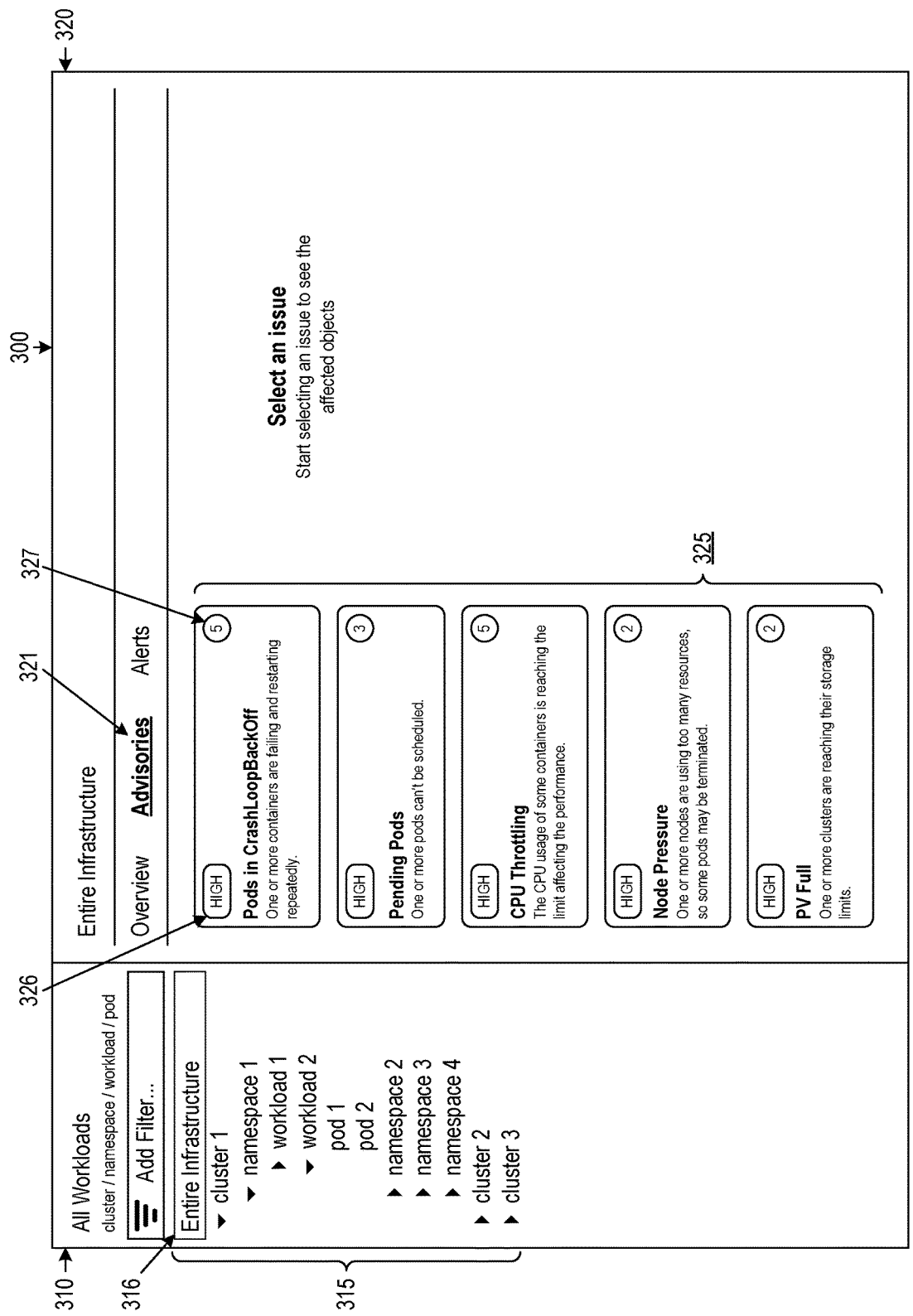
FIG. 3A illustrates an example screen of a graphical user interface (GUI) of the troubleshooting system in accordance with an illustrative embodiment.

FIGS. 3A-3G are example screens of display of a troubleshooting user interface for troubleshooting issues in a clustered application infrastructure. FIG. 3A illustrates an example screen of a graphical user interface (GUI) of the troubleshooting system in accordance with an illustrative embodiment. With reference to FIG. 3A, troubleshooting graphical user interface (GUI) 300 includes a first panel 310 and a second panel 320. First panel 310 presents an infrastructure hierarchy 315 of the clustered application infrastructure. Level indicator 316 highlights a level of the infrastructure hierarchy that is currently in focus. As seen in the depicted example, the infrastructure hierarchy 315 can be expanded or contracted by selection of graphical indicators for each level that can be expanded or contracted. For example, the "Entire Infrastructure" level includes cluster1, cluster2, and cluster3. The user can select the indicator before cluster1 to expand that level and show namespace1, namespace2, namespace3, and namespace4 under cluster1. That is, cluster1 includes four namespaces. Further, the user can select the indicator before namespace1 to expand that level to show workload1 and workload2. Still further, the user can select the indicator before workload2 to expand that level to show pod1 and pod2.

In the example depicted in FIG. 3A, the level corresponding to the entire infrastructure is in focus according to level indicator 316, and the second panel 320 displays information for the entire infrastructure. The second panel 320 includes a plurality of tabs, including "Overview," "Advisories," and "Alerts" in this example. The troubleshooting GUI 300 presents troubleshooting and remediation information under the "Advisories" tab 321.

In the depicted example, the first panel further includes a filter field 317 that enables a user to search the infrastructure hierarchy. In some implementations, a clustered application infrastructure can include dozens of clusters and hundreds, if not thousands, of pods; therefore, navigating the infrastructure hierarchy can become difficult. If the user knows the identifying information of a namespace, workload, or pod, the user can enter filter criteria, such as a keyword, into the filter field 317 to narrow down the infrastructure hierarchy. In one embodiment, in response to a user entering filter criteria into the filter field 317, the first panel 310 reduces the infrastructure hierarchy to include only levels of the infrastructure hierarchy that match the filter criteria. In another embodiment, in response to the user entering filter criteria into the filter field 317, the first panel 310 expands the infrastructure hierarchy and highlights levels of the infrastructure hierarchy that match the filter criteria.

Figure 3B:
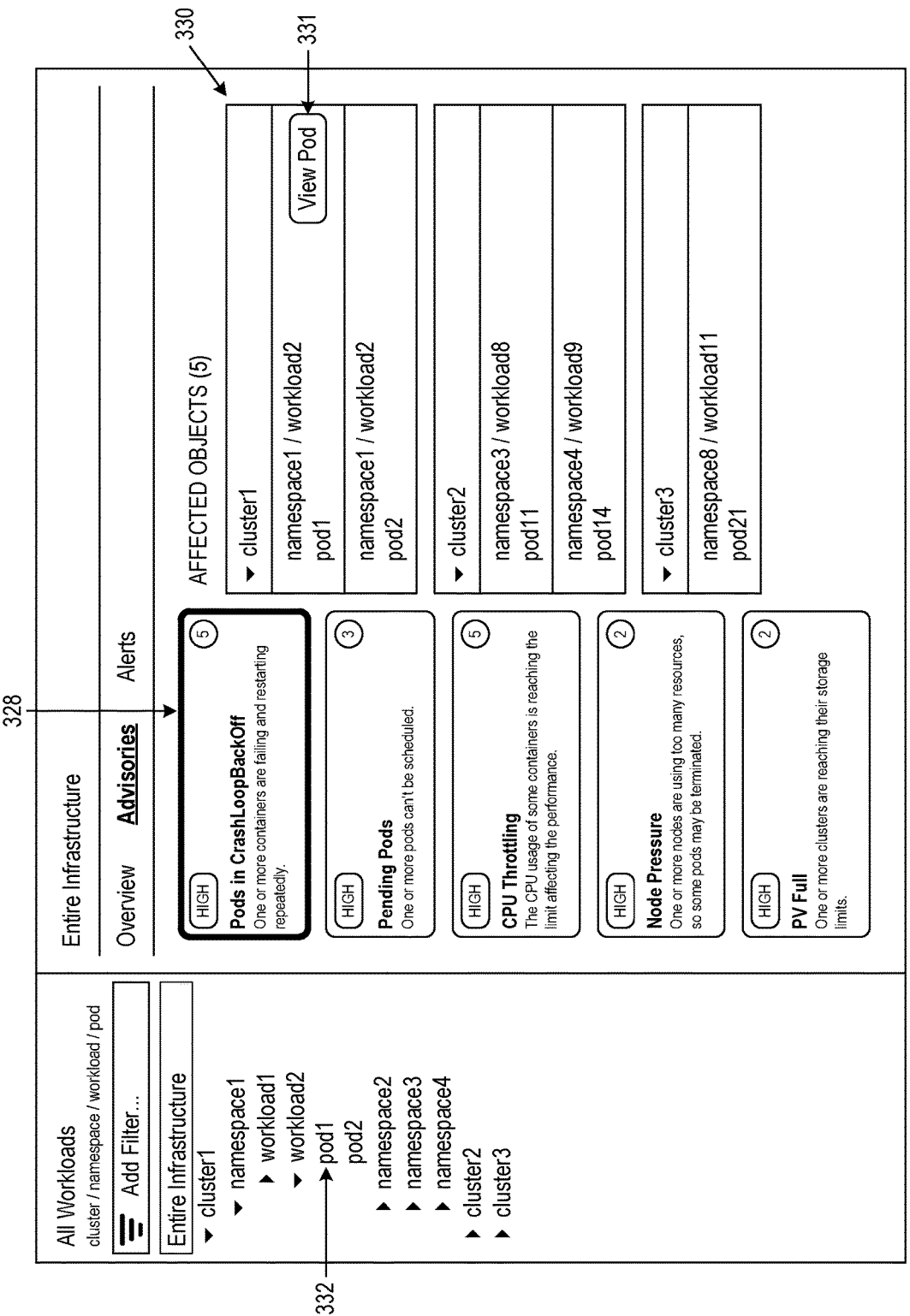
FIG. 3B illustrates an example screen of the GUI showing affected objects for a selected issue category in accordance with an illustrative embodiment.

The second panel 320 presents a set of advisories 325, which are presented as card graphics in the depicted example. Each card graphic presents a severity 326, a scope 327, which can be a number of affected objects, an issue name, and a brief description of the issue. In one embodiment, the advisories 325 correspond to the level of the infrastructure hierarchy that is in focus. A default level is that of the entire infrastructure. If the user selects a level of the infrastructure hierarchy 315, then the second panel 320 presents a subset of advisories 325 having objects that are affected by instances of the issue categories that were detected by the troubleshooting system. The user can then drill down to a level of interest, and the second panel 320 presents the appropriate advisories for that level. For example, an issue that occurs at a given pod will affect the workload of the given pod, the namespace of that workload, and the cluster of that namespace. This is shown in FIG. 3B, described in further detail below, where the pods that are in CrashLoopBackOff are shown with their associated workloads, namespaces, and clusters. Thus, if the user selects cluster1, the list of advisories will cover every issue category for which there are instances that affect cluster1.

FIG. 3B illustrates an example screen of the GUI showing affected objects for a selected issue category in accordance with an illustrative embodiment. In the example shown in FIG. 3B, the "CrashLoopBackOff" advisory 328 is selected, and the second panel 320 presents the list of affected objects 330 as hardware entities or software components in the clustered application infrastructure. In this example, there are five affected objects including pod1 under namespace1/workload2, which is under cluster1, pod2 under namespace1/workload2, which is under cluster1, pod11 under namespace3/workload8, which is under cluster2, pod14 under namespace4/workload9, which is under cluster2, and pod21 under namespace8/workload11, which is under cluster3. In this example, while the issue is manifested in identifiable containers, as the infrastructure hierarchy is managed down to the pod level, the affected objects are shown at the pod level. This eliminates any manual effort to drill down the infrastructure hierarchy from the top level in order to determine the exact path associated with the affected objects. An affected object can be any entity managed by the cluster management framework. The affected objects depend on the issue category. By design, the entities in the infrastructure hierarchy correspond to the possible issue categories being reported; the user should be able to navigate to any affected object (entity), either by clicking a link in the affected object list or by navigating via the infrastructure hierarchy.

In the example shown in FIG. 3B, a user can select "pod1" 332 in the first panel. In one embodiment, the second panel then reverts to the display of FIG. 3A showing only those advisories having "pod1" as an affected object. In an alternative embodiment, in response to the user selecting "pod1" 332 in FIG. 3B, the second panel filters affected objects panel 330 to include only pod1. Thus, in an embodiment, selecting a level of the infrastructure hierarchy filters the information shown in the second panel 320 to only information relevant to the selected level, whether that information is a list of advisories, a list of affected objects, or data relevant to an issue category.

Furthermore, each object has associated infrastructure hierarchy metadata. For example, pod1 is associated with cluster1/namespace1/workload2. Therefore, in response to a user selecting workload2, the second panel 320 shows only pod1 and pod2 as affected objects, because pod11, pod14, and pod21 do not have workload2 in their infrastructure hierarchy metadata. The same would be true if the user selected namespace1 or cluster 1.

Figure 3C:
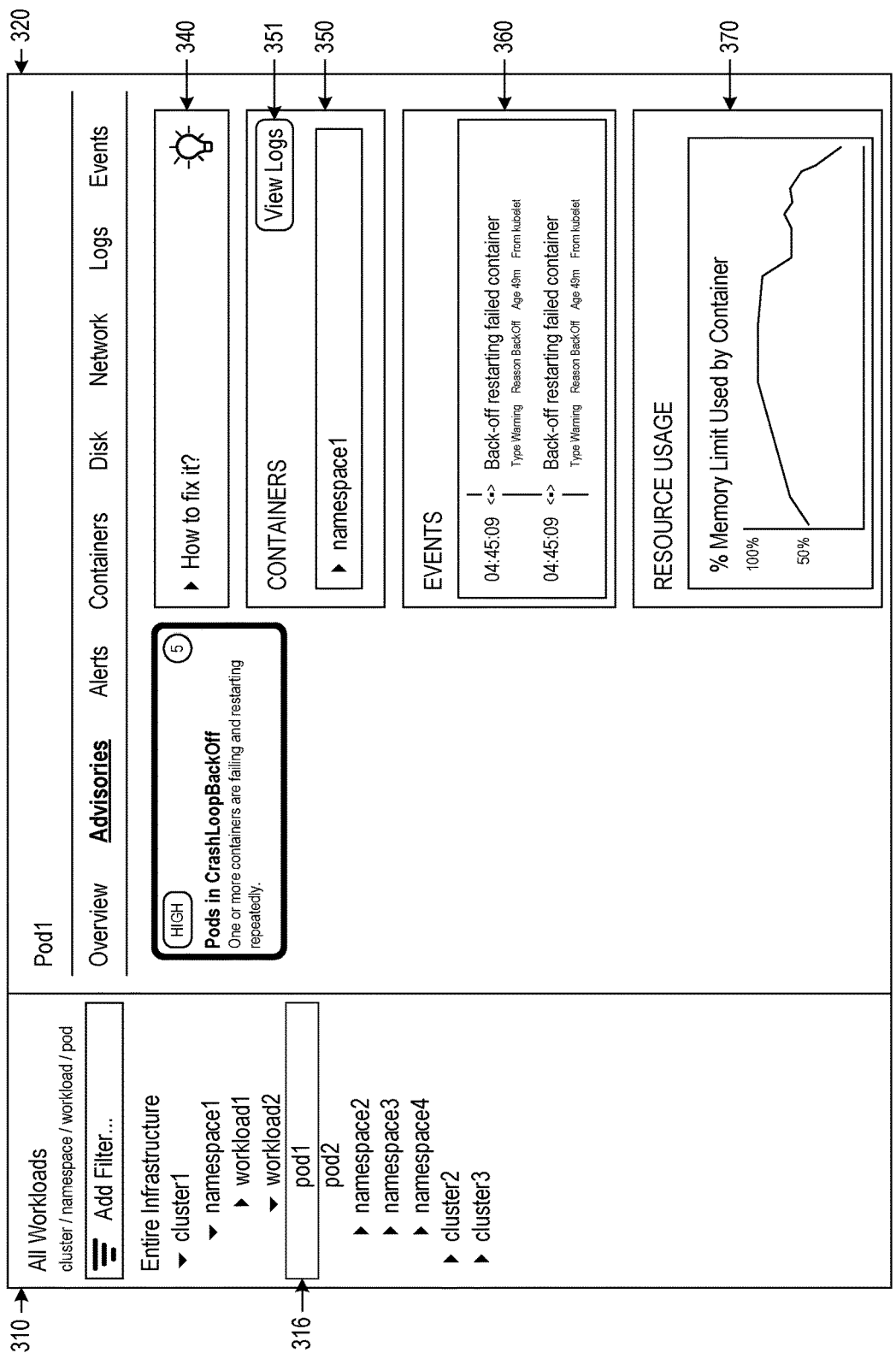
FIG. 3C illustrates an example screen of the GUI showing sub-panels presenting data relevant to a selected affected object in accordance with an illustrative embodiment.

The user can then select a pod, in this case pod1, to view by selecting the "View Pod" button 331. FIG. 3C illustrates an example screen of the GUI showing sub-panels presenting data relevant to a selected affected object in accordance with an illustrative embodiment. With reference now to FIG. 3C, responsive to the user selecting "View Pod" button 331 associated with "pod1," the resulting troubleshooting GUI 300 presents information specific to the "Pods in CrashLoopBackOff" issue for Pod1. The first panel 310 shows the level indicator 316 highlighting "pod1" in the infrastructure hierarchy. The second panel 320 now shows remediation sub-panel 340, containers sub-panel 350, events sub-panel 360, and resource usage sub-panel 370. The remediation sub-panel 340 can be selected to show remediation steps for troubleshooting or fixing the "CrashLoopBackOff" issue. Sub-panels 350, 360, and 370 are sub-panels of second panel 320 that present data relevant to resolving the "CrashLoopBackOff" issue for pod1. The tabs in the second panel 320 are also context-dependent and now show additional tabs for "Containers," "Disk," "Network," "Logs," and "Events."

As discussed above, based on historical data or domain knowledge, the troubleshooting system could identify the types of data that can be relevant to a particular issue. For this "Pods in CrashLoopBackOff" issue category, the potential causes can lie in the container configurations or operations, disk configurations or operations, network configurations or operations. Logs recording the full list of operations or event records recording selected events can also be useful to diagnosing the issue. Therefore, the menus for the tabs in 320 are adjusted accordingly. The sub-panels can be seen to present a summary of information that could be available on the tabs. For example, the sub-panel 351 may correspond to the Containers tab, the sub-panel 360 could correspond to the Events tab, while the sub-panel 370 could correspond to the Disk tab and/or the Network tab.

Figure 3D:
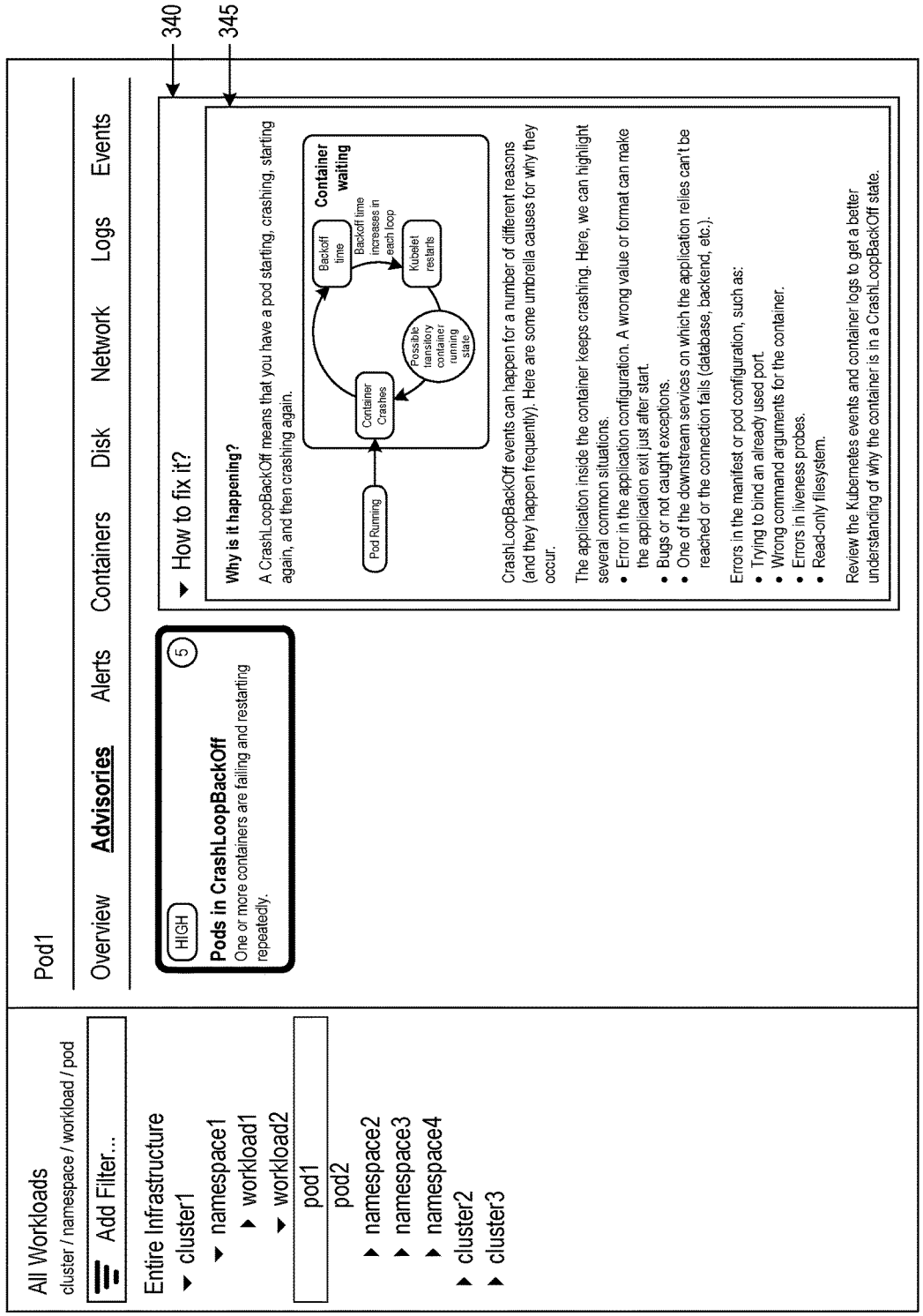
FIG. 3D illustrates an example screen of the GUI presenting remediation steps for a selected affected object in accordance with an illustrative embodiment.

FIG. 3D illustrates an example screen of the GUI presenting remediation steps for a selected affected object in accordance with an illustrative embodiment. FIG. 3D illustrates the remediation sub-panel 340 expanded to show remediation information 345. The remediation information 345 includes an explanation of what can cause the issue and what data to look for to further diagnose the issue, which can conveniently be found in the other sub-panels or other tabs. For example, one cause would be errors in the "pod configuration" related to "command arguments for the container," for which further information can then be found on the Containers tab, related to the "filesystem," for which further information could be found on the Disk tab, or related to "already used port," for which further information could be found on the Network tab. Thus, the troubleshooting GUI 300 combines expert knowledge about troubleshooting issues with queries that are specifically configured to gather the relevant data from the entire infrastructure to allow the user to identify and resolve issues that occur in the clustered application infrastructure without the burden of identifying relevant portions of the event logs and performance metrics, for example.

Figure 3E:
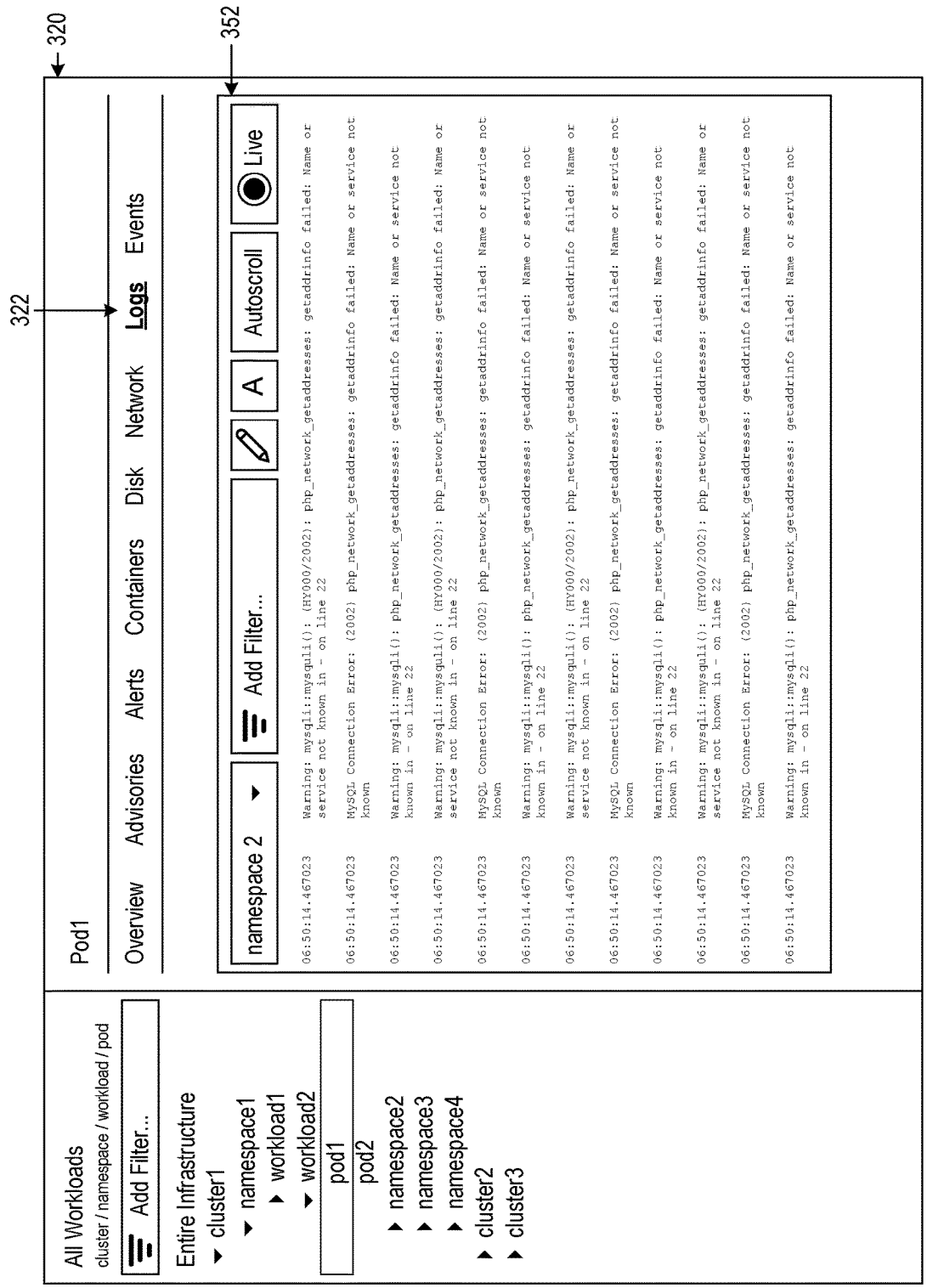
FIG. 3E illustrates an example screen of the GUI presenting an event log associated with a selected affected object in accordance with an illustrative embodiment.

Returning to FIG. 3C, the container sub-panel 350 includes a "View Logs" button 351, which takes the user directly to the container logs. FIG. 3E illustrates an example screen of the GUI presenting an event log associated with a selected affected object in accordance with an illustrative embodiment. With reference now to FIG. 3E, the second panel 320 shows a logs panel 352, which can be displayed in response to the user selecting "Logs" tab 322 or the "View Logs" button 351 illustrated in FIG. 3C. Based on the remediation information 345 shown in FIG. 3D, the user now knows to look for patterns that indicate why the pod is in CrashLoopBackOff and how to fix the issue.

Figure 3F:
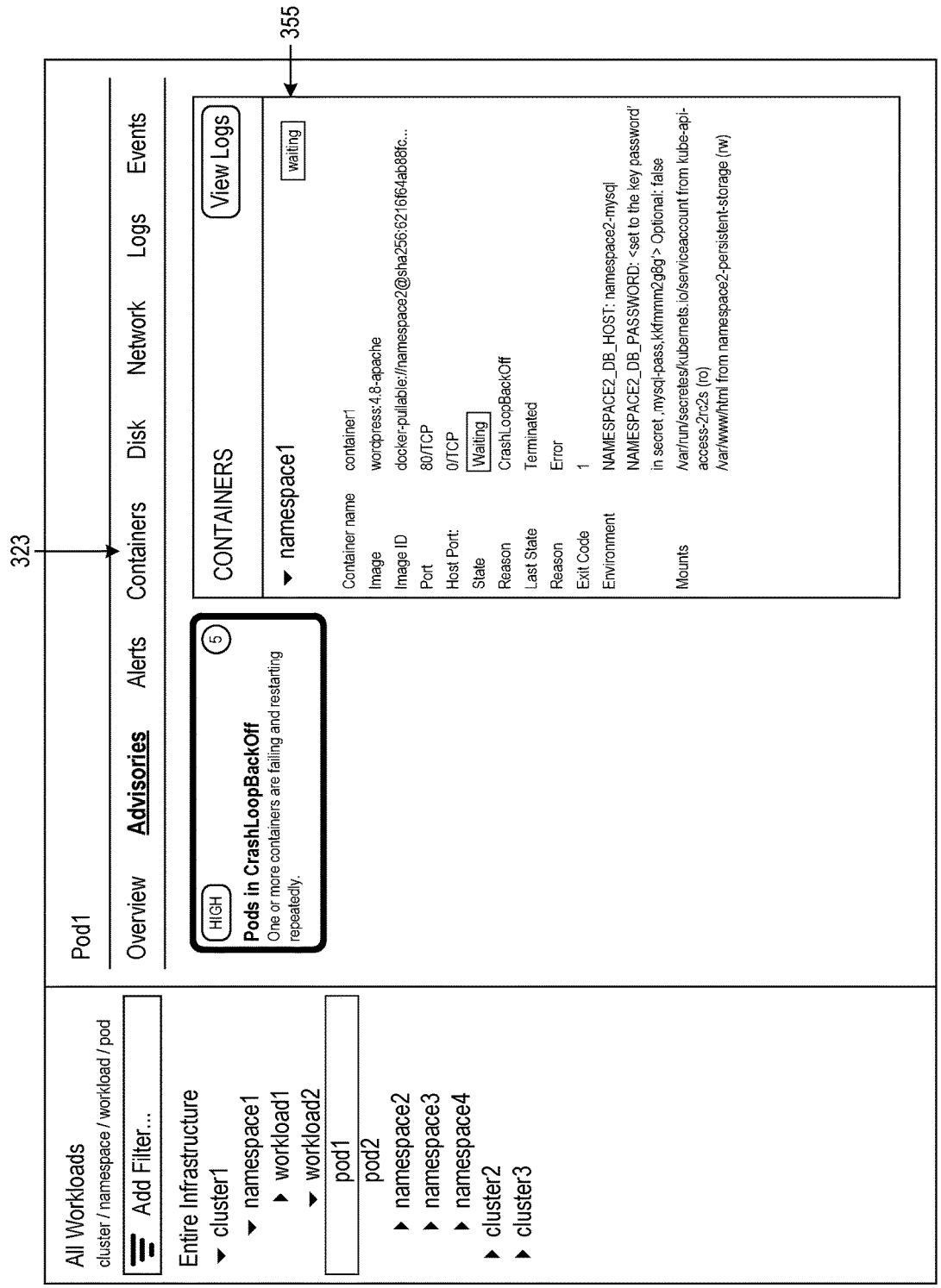
FIG. 3F illustrates an example screen of the GUI presenting container information of a container related to a selected affected object in accordance with an illustrative embodiment.

FIG. 3F illustrates an example screen of the GUI presenting container information of a container related to a selected affected object in accordance with an illustrative embodiment. Because the "Pods in CrashLoopBackoff" issue category indicates issues related to managing containers within a pod, it is useful to show real-time container information, such as the current state and reasons for arriving at the current state. Turning to FIG. 3F, the second panel 320 shows a sub-panel 355 of container components. The second panel 320 can show this sub-panel in response to the user selecting container sub-panel 350 shown in FIG. 3C or the "Containers" tab 323. In one embodiment, retrieving relevant data can include running a command in the cluster management framework. For example, the remediation sub-panel 340 in FIG. 3D can present prompts to the user to retrieve the relevant information, to switch to one of the other sub-panels, or to switch to one of the tabs for an extended view of the relevant information. In one example embodiment, the remediation sub-panel can present a prompt to run a command, such as a "kubectl describe" command in the Kubernetes® cluster management framework. Sub-panel 355 is an example of results of such a command for a particular container in response to a user accepting a prompt.

Figure 3G:
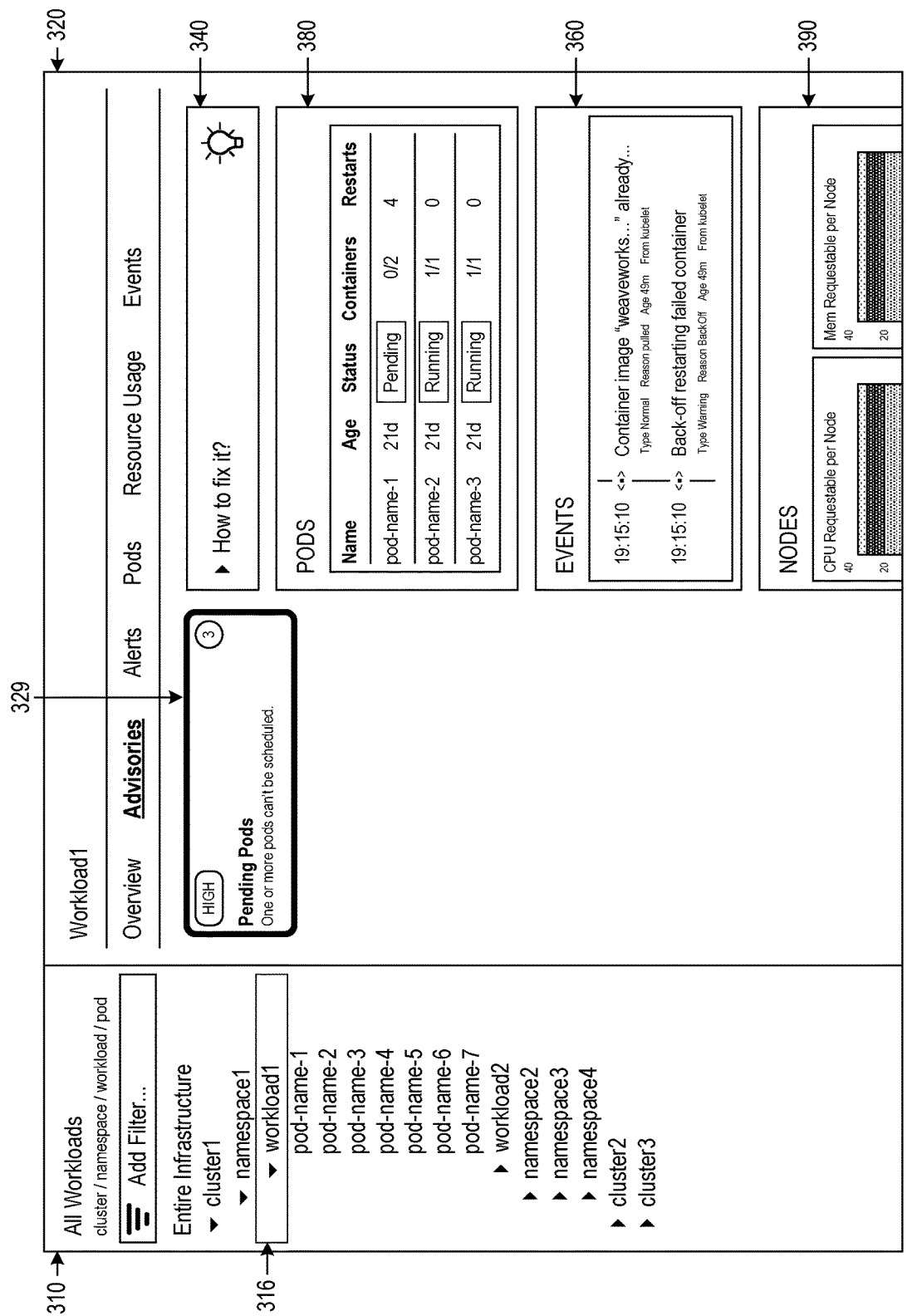
FIG. 3G illustrates an example screen of the GUI presenting an issue category and relevant sub-panels associated with a level of an infrastructure hierarchy in accordance with an illustrative embodiment.

FIG. 3G illustrates an example screen of the GUI presenting an issue category and relevant sub-panels associated with a level of an infrastructure hierarchy in accordance with an illustrative embodiment. FIG. 3G depicts an example display with the "Pending Pods" advisory illustrated in FIG. 3A selected, shown as advisory 329 in FIG. 3G. The level indicator 316 shows the workload1 level highlighted in the first panel 310. In the depicted example, the workload1 level is highlighted in the infrastructure hierarchy in the first panel 310 because the user clicked on that level in the first panel 310 or because the user clicked on its corresponding link in the "Affected Objects" list shown in the advisories tab of any ancestor of the "workload1" level in the infrastructure hierarchy. An ancestor is a parent or higher-level object in the infrastructure hierarchy. The second panel 320 shows remediation sub-panel 340, pods sub-panel 380, events sub-panel 360, and nodes sub-panel 390, which are specific to the context of the "Pending Pods" advisory and the workload1 level of the infrastructure hierarchy. In this example, the pods sub-panel 380 shows the status of the pods running in workload1. The events sub-panel 360 now shows events that are relevant to the "Pending Pods" issue and the workload1 level of the infrastructure hierarchy. The pods and events shown in FIG. 3G are specific to the "workload1" level of the infrastructure hierarchy. The "Nodes" sub-panel 390 shows all nodes on which the workload is running. The data shown in the sub-panel 390 should be scoped according to the selected objects in the infrastructure hierarchy the same way the Events sub-panel 360 and Pods sub-panel 380 are. The nodes sub-panel 390 shows node-specific and context-dependent performance metrics for the nodes to which workload1 is assigned. Since the "Pending Pods" issue category indicates issues related to scheduling pods based on computing resources available at the node level, it is useful to show real-time node information, such as the amount of memory that can be requested by a node.

As shown in FIG. 3G, the second panel also includes tabs that are specific to the data shown in the sub-panels 380, 360, 390. The user can switch to an extended view of the "Pods" sub-panel 380 by selecting the "Pods" tab, the user can switch to a more focused view of the "Events" sub-panel by selecting the "Events" tab, and the user can switch to a more focused view of the "Nodes" sub-panel by selecting the "Resource Usage" tab.

As can be seen in the depicted examples, the sub-panels and tabs shown in the troubleshooting GUI 300 are dynamically created and populated with context-dependent information depending on the issues that are detected and the objects that are affected. Furthermore, a user can go up and down the infrastructure hierarchy quickly and efficiently while resolving a specific issue. For example, for the "PV Full" issue category, the issue shows up as a pod-level issue, but the cause is usually at the cluster level; therefore, the remediation can direct the user to traverse up the infrastructure hierarchy to the cluster level. This makes troubleshooting and issue remediation easier for the user, thus resulting in improved clustered application infrastructure management.

4.0 Procedural Overview

FIG. 4 is a flowchart illustrating operation of a troubleshooting system in accordance with an illustrative embodiment. The process described can be performed by a single program or multiple programs. The steps of the process as shown in FIG. 4 may be implemented using processor-executable instructions that are stored in computer memory. Each step in FIG. 4 may represent a module, segment, or portion of instructions that comprises one or more executable instructions for implementing the specified logical functions. In some alternative implementations, the functions in the steps may occur out of the order noted in the figure. For example, two steps shown in succession may, in fact, be executed substantially concurrently, or the steps may sometimes be executed in the reverse order, depending on the functionality involved. For the purposes of providing a clear example, the steps of FIG. 4 are described as being performed by computer programs executing on the troubleshooting system 110. For the purposes of clarity, the process described may be performed with more or fewer steps than described in FIG. 4.

Operation begins at step 400, and the troubleshooting system 110 is configured to collect data from monitors and agents throughout the infrastructure at step 401. In one embodiment, a data collection service 211 within the troubleshooting system 110 gathers data from monitoring services and agents executing within the infrastructure to capture real-time performance metrics, time series data, cluster management framework events, container event logs, and the like. The data collection service 211 packages the collected data with enriched labels based on the infrastructure hierarchy and relationships between objects within the infrastructure hierarchy. In an embodiment, the data collection service 211 stores the labeled data in metrics database 250. In another embodiment, the data collection service 211 also collects non-metrics data, such as event and container logs, and stores the non-metrics data in a non-metrics database 260.

At step 402, the troubleshooting system 110 is configured to associate issue categories with sets of queries. The issues occur in the clustered application infrastructure. The clustered application infrastructure has an associated infrastructure hierarchy.

At step 403, the troubleshooting system 110 is configured to perform the set of queries on the metrics database to retrieve sets of metrics that indicate issues for each issue category. In one embodiment, a query processing service 214 performs a predetermined set of queries for each of a plurality of issue categories, and an issue detection service 212 compares the results to detection criteria to detect issues within the clustered application infrastructure. In an embodiment, the detection criteria can be a set of thresholds. For example, the query processing service 214 can execute a query to determine how long a pod has been in a "waiting" state, and the issue detection service 212 can compare the result to a threshold. In other examples, the queries and detection criteria may be more complex, such as pattern detection, application of rules, using supervised or unsupervised machine learning models, or the like. In a further embodiment, the issue detection service 212 detects instances of the categories of issues and identifies the objects that are affected by the issues. Thus, the issue detection service 212 is configured with logic based on expert knowledge of common issues and how they affect objects in the clustered application infrastructure.

At step 404, the troubleshooting system 110 is configured to determine one or more affected objects in the infrastructure hierarchy for each issue category based on the sets of metrics. At step 405, the troubleshooting system 110 is configured to identify remediation information for resolving each issue category. The remediation information includes at least a cause of the issue category. In some embodiments, the remediation information includes a description of why the issue occurs and what metrics or non-metric data to look for. In one embodiment, the remediation information includes a set of remediation steps to carry out to resolve the issue category. In one embodiment, the query processing service 214 queries the metrics database 250 and the non-metrics database 260 for the remediation information and data relevant to remediation of the detected issues. In an embodiment, the query processing service 214 performs a predetermined set of queries based on the issue categories and the affected objects. In one embodiment, the query processing service 214 retrieves the remediation steps from the infrastructure database 250; however, in an alternative embodiment, the logic of the troubleshooting system 110 can include the remediation steps for known issues.

At step 406, the troubleshooting system 110 is configured to cause a graphical user interface (GUI) to present at least a subset of the issue categories and corresponding remediation information. In an embodiment, a GUI generation service 213 builds a troubleshooting GUI 215 having a first panel for presenting a hierarchy of the infrastructure and a second panel for presenting advisories corresponding to the categories of detected issues. The troubleshooting GUI 215 can include various GUI components, such as tabs, card graphics, graphical indicators, expandable tree structures, drop-down boxes, buttons, lists, graphs, and so forth. For example, the infrastructure hierarchy in the first panel can be presented as an expandable tree structure. As another example, the second panel of the troubleshooting GUI 215 can present each issue category as a card graphic.

In one embodiment, the troubleshooting system 110 is configured to cause the troubleshooting GUI 215 to be presented by causing the GUI panels and other components to be presented in a client application executing on a user device. The client application can communicate with the troubleshooting system 110 via one or more Application Programming Interfaces (APIs). In another embodiment, the troubleshooting system 110 is configured to cause the troubleshooting GUI 215 to be presented by the user via a Web server such that the user interacts with the troubleshooting GUI 215 using a Web browser.

At step 407, the troubleshooting system 110 is configured to determine whether the user selects a given issue category. If the user selects an issue category in step 407, the troubleshooting system 110 is configured to cause the troubleshooting GUI 215 to query metrics database 250 and non-metrics database 260 to retrieve data relevant to the selected issue category in step 407. Then, in step 408, the troubleshooting system 110 is configured to present the remediation steps and one or more sub-panels showing data relevant to the selected issue. In one embodiment, the one or more sub-panels are context-dependent such that different sub-panels are shown for different levels of the infrastructure hierarchy.

For instance, if a selected issue affects objects at the node level, then node-level sub-panels are generated and shown by the troubleshooting GUI 215. The user is then able to interact with the remediation steps and the one or more sub-panels to perform guided troubleshooting to resolve the issues.

Thereafter, or if the user does not select an issue category in step 407, operation returns to block 406 to cause the GUI 215 to present the issue categories and the corresponding remediation information. In one embodiment, the troubleshooting system 110 is configured to cause the troubleshooting GUI 215 to present a subset of the detected issues corresponding to the level of the infrastructure hierarchy selected by the user. For example, as shown in FIG. 3G, in response to the user selecting a given workload in the infrastructure hierarchy, the troubleshooting GUI presents issues affecting the selected workload. This allows the user to select an object of interest in the infrastructure hierarchy, such as a given workload or pod. Thus, the troubleshooting GUI 215 provides an interactive GUI that provides guided troubleshooting of issues that are of interest to the user. The troubleshooting system 110 is configured to perform the appropriate queries and generates sub-panels that are suitable for the context. In this manner, the user can select issues of interest or focus on levels of the infrastructure hierarchy. Alternatively, operation can return to earlier steps to repeat the collection of data, query the infrastructure database, and/or generate the GUI to update the information being displayed based on the current state of the clustered application infrastructure. In another embodiment, the issues and data being shown can be consistently or periodically updated to show the state of the infrastructure in real time.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 Extensions and Alternatives

In other embodiments, the troubleshooting system can rank advisories based on severity or scope or a combination thereof. The troubleshooting system can calculate a combined severity and scope score and rank the advisories accordingly. Other techniques for ranking advisories can also be used within the spirit and scope of the embodiments described herein.

In the foregoing specification, embodiments of the invention have been described with reference to numerous specific details that can vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of troubleshooting issues occurring in a clustered application infrastructure, the method comprising:
    collecting data from an execution environment including one or more hosts running a containerized application deployed onto the clustered application infrastructure, processing the collected data, and storing the processed data in at least one database;
    performing, by a processor, queries on the at least one database to retrieve metrics about the clustered application infrastructure;
    comparing, by the processor, the retrieved metrics against detection criteria for different categories of issues to detect issues occurring in the clustered application infrastructure;
    determining, by the processor, for each issue category within a plurality of issue categories, one or more objects within the clustered application infrastructure that are affected by the issues of the issue category;
    performing, by the processor, one or more queries on the at least one database to retrieve a set of data associated with the one or more affected objects and related to a set of remediation steps; and
    generating, by the processor, a troubleshooting graphical user interface (GUI) to be presented on a user device, the troubleshooting GUI comprising a first area configured to present objects of the clustered application infrastructure as nodes of a hierarchy, and a second area configured to present the issue categories, wherein
    each of the issue categories is associated with one or more levels of the hierarchy, and responsive to a selection of an issue category in the troubleshooting GUI, the troubleshooting GUI is updated to present the one or more objects within the clustered application infrastructure that are affected by the issues of the selected issue category.

2. The computer-implemented method of claim 1, wherein
    responsive to a selection of an object from the one or more affected objects, the troubleshooting GUI is further updated to present information about the selected object.

3. The computer-implemented method of claim 2, wherein
    the troubleshooting GUI as further updated includes tabs and sub-panels in one screen in a context-dependent manner, and
    a tab corresponds to one or more sub-panels, the sub-panels including sub-panels for remediation, logs, events, resource usage, and available resources.

4. The computer-implemented method of claim 3, wherein
    responsive to a selection of a remediation sub-panel, the troubleshooting GUI is further updated to present the set of remediation steps for the selected object.

5. The computer-implemented method of claim 1 wherein
    responsive to a selection of an object in the first area of the troubleshooting GUI, the troubleshooting GUI is updated to present a subset of the plurality of issue categories that affect the selected object.

6. The computer-implemented method of claim 2 wherein
    further responsive to the selection of the object from the one or more affected objects, the troubleshooting GUI is further updated to indicate a level in the hierarchy corresponding to the selected object.

7. The computer-implemented method of claim 1, further comprising:
presenting a prompt to retrieve information associated with one of the affected objects; and
responsive to an acceptance of the prompt, dynamically running a command to retrieve the information.

8. The computer-implemented method of claim 1, wherein the hierarchy comprises a cluster level, a namespace level, which is at a lower level of the hierarchy than the cluster level, a workload level, which is at a lower level of the hierarchy than the namespace level, and a pod level, which is at a lower level of the hierarchy than the namespace level.

9. The computer-implemented method of claim 8, wherein the plurality of issue categories includes one or more of: performance issues, low or exhausted resource availability, error states, degraded states, unresponsive or crashed pods or containers, or halted or force stopped pods or containers within the clustered application infrastructure.

10. The computer-implemented method of claim 1, further comprising:
responsive to receiving a request from the user to remediate an issue, causing at least a portion of the set of remediation steps to be automatically carried out,
the set of remediation steps including updating configurations for an object or allocating resources in the clustered application infrastructure.

11. The computer-implemented method of claim 1,
wherein the at least one database includes infrastructure data that comprise extended metrics with one or more enriched labels that identify associated objects and relationships within the levels of the hierarchy,
wherein each extended metric of the extended metrics is stored as one row and the extended metrics are stored in one table, and
wherein results of the queries are segmented based on the levels of the hierarchy.

12. One or more non-transitory computer-readable storage media storing instructions which when executed cause one or more processors to perform a method for troubleshooting issues occurring in a clustered application infrastructure, the method comprising:
collecting data from an execution environment including one or more hosts running a containerized application deployed onto the clustered application infrastructure, processing the collected data, and storing the processed data in at least one database;
performing, by a processor, queries on the at least one database to retrieve metrics about the clustered application infrastructure;
comparing, by the processor, the retrieved metrics against detection criteria for different categories of issues to detect issues occurring in the clustered application infrastructure;
determining, by the processor, for each issue category within a plurality of issue categories, one or more objects within the clustered application infrastructure that are affected by the issues of the issue category;
performing, by the processor, one or more queries on the at least one database to retrieve a set of data associated with the one or more affected objects and related to a set of remediation steps; and
generating, by the processor, a troubleshooting graphical user interface (GUI) to be presented on a user device, the troubleshooting GUI comprising a first area configured to present objects of the clustered application infrastructure as nodes of a hierarchy, and a second area configured to present the issue categories, wherein
each of the issue categories is associated with one or more levels of the hierarchy, and responsive to a selection of an issue category in the troubleshooting GUI, the troubleshooting GUI is updated to present the one or more objects within the clustered application infrastructure that are affected by the issues of the selected issue category.

13. The one or more non-transitory computer-readable storage media of claim 12, wherein
responsive to a selection of an object from the one or more affected objects, the troubleshooting GUI is further updated to present information about the selected object.

14. The one or more non-transitory computer-readable storage media of claim 13, wherein
the troubleshooting GUI as further updated includes tabs and sub-panels in one screen in a context-dependent manner, and
a tab corresponds to one or more sub-panels, which include sub-panels for remediation, logs, events, resource usage, and available resources.

15. The one or more non-transitory computer-readable storage media of claim 14, wherein
responsive to a selection of a remediation sub-panel, the troubleshooting GUI is further updated to present the set of remediation steps for the selected object.

16. The one or more non-transitory computer-readable storage media of claim 12 wherein
responsive to a selection of an object in the first area of the troubleshooting GUI, the troubleshooting GUI is updated to present a subset of the plurality of issue categories that affect the selected object.

17. The one or more non-transitory computer-readable storage media of claim 13 wherein
further responsive to the selection of the object from the one or more affected objects, the troubleshooting GUI is further updated to indicate a level in the hierarchy corresponding to the selected object.

18. The one or more non-transitory computer-readable storage media of claim 12, the method further comprising:
responsive to receiving a request from the user to remediate an issue, causing at least a portion of the set of remediation steps to be automatically carried out,
the set of remediation steps including updating configurations for an object or allocating resources in the clustered application infrastructure.

* * * * *